(12) United States Patent
Russell et al.

(10) Patent No.: US 11,389,914 B2
(45) Date of Patent: Jul. 19, 2022

(54) ADAPTIVE TOOLING SYSTEM

(71) Applicant: Leidos Security & Automation Limited, Kempston (GB)

(72) Inventors: Edward John Russell, Essex (GB); Ben Donald Henry Auty, Essex (GB); Benjamin Edward Howard, Essex (GB)

(73) Assignee: LEIDOS SECURITY DETECTION & AUTOMATION U.K. LTD, London (GB)

( * ) Notice: Subject to any disclaimer, the term of this patent is extended or adjusted under 35 U.S.C. 154(b) by 0 days.

(21) Appl. No.: 17/067,602

(22) Filed: Oct. 9, 2020

(65) Prior Publication Data

US 2021/0107099 A1 Apr. 15, 2021

Related U.S. Application Data

(60) Provisional application No. 62/914,077, filed on Oct. 11, 2019.

(51) Int. Cl.
*B23P 19/04* (2006.01)
*B25B 11/00* (2006.01)
*B62D 65/00* (2006.01)

(52) U.S. Cl.
CPC .............. *B23P 19/04* (2013.01); *B25B 11/00* (2013.01); *B62D 65/00* (2013.01)

(58) Field of Classification Search
CPC ........ B23Q 3/101; B23Q 3/102; B23Q 3/103; B23Q 3/106; B23Q 3/107; B23Q 3/108;
(Continued)

(56) References Cited

U.S. PATENT DOCUMENTS 4,121,817 A * 10/1978 Pavlovsky ............. B23Q 3/106
269/296
4,429,862 A * 2/1984 Niedecker .............. B23Q 1/545
269/258

(Continued)

FOREIGN PATENT DOCUMENTS

EP 0310967 A2 * 4/1989 ........... B23Q 16/001
GB 2214454 A 9/1989

OTHER PUBLICATIONS

Translated description of EP0310967 (Year: 2021).*
International Search Report and Written Opinion for Application No. PCT/US2020/055027, dated Jan. 28, 2021, 11 pages.

*Primary Examiner* — Tyrone V Hall, Jr.
*Assistant Examiner* — Jacob Adam Montgomery
(74) *Attorney, Agent, or Firm* — McCarter & English, LLP

(57) ABSTRACT

An example adaptive tooling system is provided that includes an adaptive base plate assembly and a tool base assembly selectively engageable with each other. The adaptive base plate assembly includes a base plate with holes formed therein, and location pins attached to the base plate via the holes. The tool base assembly includes a central support member, first and second lock plates, and a latch pivotably disposed relative to the central support member. The first and second lock plates include an opening formed therein. The opening of the lock plates is configured to at least partially receive first and second location pins of the location pins of the adaptive base plate assembly. The latch is configured to releasably engage with a third location pin of the location pins of the adaptive base plate assembly to releasably engage the tool base assembly with the adaptive base plate assembly.

21 Claims, 11 Drawing Sheets

(58) Field of Classification Search
CPC .. B25H 1/08; B25H 5/00; B23P 19/04; B25B 11/00; B25B 5/006; B62D 65/00
USPC .......................................... 269/309, 310, 311
See application file for complete search history.

(56) References Cited

U.S. PATENT DOCUMENTS

| | | |
|---|---|---|
| 4,711,437 A | 12/1987 | Longenecker et al. |
| 4,934,680 A * | 6/1990 | Schneider ............ B23Q 1/0072 269/309 |
| 6,155,616 A | 12/2000 | Akright |
| 6,494,445 B1 | 12/2002 | Bellis, Jr. |
| 8,534,658 B2 * | 9/2013 | Schron, Sr. ........... F16B 21/165 269/289 R |

* cited by examiner

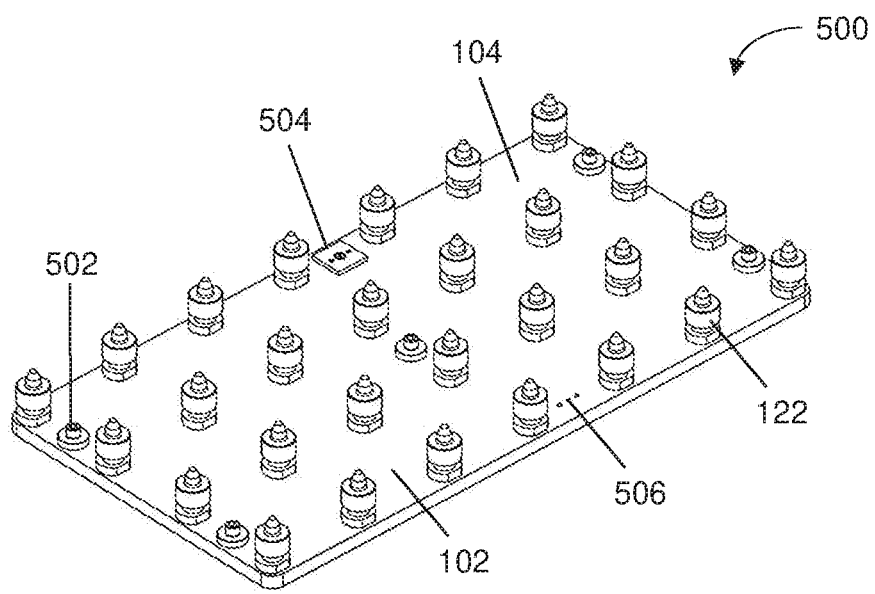
FIG. 12
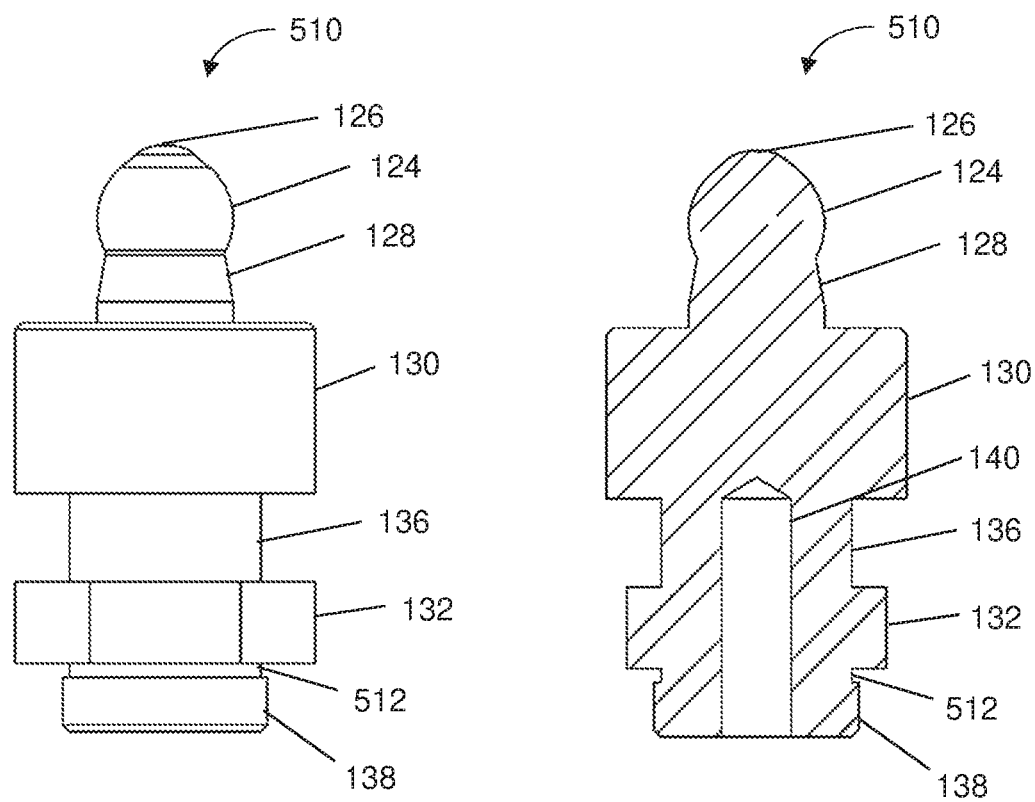
FIG. 13
FIG. 14

ADAPTIVE TOOLING SYSTEM

CROSS-REFERENCE TO RELATED APPLICATIONS

This application claims the benefit of commonly assigned U.S. Provisional Patent Application No. 62/914,077, which was filed on Oct. 11, 2019. The entire content of the foregoing provisional patent application is incorporated herein by reference.

BACKGROUND

Current tooling solutions generally use a series of tooling components that are fixed to a base plate or palette. Such systems can create difficulties when new products or modifications to existing products are introduced. Due to the fixed tooling components, when a new product or modification is introduced, the fixed tooling components and base plate can become obsolete and are generally replaced with new base plates and tooling components to accommodate the changes in design.

For example, a company manufacturing a small hatchback vehicle can use a series of tooling components fixed to a base plate or palette. If the company decides that the small hatchback vehicle is no longer in high demand in the consumer market, and decides to manufacture a petrol hybrid electric sports utility vehicle (SUV), new tooling components are typically needed. In such cases, the base plate and tooling components are replaced to accommodate manufacturing of the new vehicle, increasing the overall cost to the manufacturer. Therefore, a small design change can result in major consequences to tooling and the manufacturing process.

SUMMARY

Exemplary embodiments of the present disclosure provide an exemplary adaptive tooling system including an adaptive base plate assembly and a tool base assembly selectively engageable with the adaptive base plate assembly. The adaptive base plate assembly includes a matrix holes configured to selectively engage pins which provide an interface for attaching one or more tool base assemblies to the adaptive base plate assembly in different positions. Tooling attachable to the tool base assembly can be changed efficiently to accommodate different products that are being manufactured without necessitating replacement of the entire base or palette. Different tooling or tooling components can be placed relative to the adaptive tooling system in a variety of orientations to support different shapes and/or sizes of products being manufactured. The adaptive tooling system thereby provides a variety of efficient, flexible, and cost-effective tooling options in an engineering environment.

In accordance with embodiments of the present disclosure, an exemplary adaptive tooling system is provided. The adaptive tooling system includes an adaptive base plate assembly and a tool base assembly. The adaptive base plate assembly includes a base plate with holes formed therein, and location pins attached to the base plate via the holes. The tool base assembly includes a central support member, first and second lock plates each including a central opening formed therein, and a latch pivotably disposed relative to the central support member. During assembly, the central opening of the first and second lock plates is configured to at least partially receive first and second location pins of the location pins of the adaptive base plate assembly. During assembly, the latch is configured to releasably engage with a third location pin of the location pins of the adaptive base plate assembly to releasably engage and secure the tool base assembly with the adaptive base plate assembly.

The holes formed in the base plate can be arranged as a matrix of holes spaced in a uniform or substantially uniform distance from each other. Each of the location pins can include a top section, a middle section, and an intermediate section. The top section can be rounded to have a decreasing diameter along a center axis towards an apex of the pin. A diameter of the middle section is dimensioned greater than a diameter of the intermediate section. A difference in the diameters of the middle and intermediate sections forms a circumferential step in the location pins. Each of the holes formed in the base plate can include a counterbored portion at a top surface of the base plate and a countersunk portion at a bottom surface of the base plate.

The tool base assembly is configured to interchangeably receive one or more tooling components. The central support member can include first and second side projections on either side of the central support member, and a central projection disposed between the first and second side projections. Two substantially U-shaped cutouts can separate the central projection from the first and second side projections. The first and second side projections of the central support member can each define bottom surfaces of the central support member. The first lock plate can be attached to the bottom surface of the first side projection and the second lock plate can be attached to the bottom surface of the second side projection.

The central opening of the first lock plate can include one or more vertical inner slots formed along a circumference of the central opening. The base plate assembly can include first and second pivot plates attached to a central protrusion of the central support member. During engagement of the tool base assembly with the adaptive base plate assembly, the first and second pivot plates can slide and be positioned against outer surfaces of the third location pin to prevent pivoting of the tool base assembly relative to the adaptive base plate assembly. The latch can be pivotably attached to the second pivot plate and can include a spring biasing the latch into a closed position. During engagement of the latch with the third location pin, a projection of the latch engages with a circumferential step of the third location pin.

In accordance with embodiments of the present disclosure, an exemplary adaptive base plate assembly is provided. The adaptive base plate assembly includes a base plate and location pins attached to the base plate. The base plate includes a matrix of holes formed therein. Each hole of the matrix of holes includes a counterbored section to form an inner step. The location pins are attached to the base plate via holes of the matrix of holes. Each of the location pins includes a top rounded section, a middle section disposed adjacent to the top rounded section, an intermediate section disposed below the middle section, a bottom section disposed below the intermediate section, and a base section defining a bottom of the location pin. A diameter of the base section is dimensioned smaller than a diameter of the bottom section such that during assembly, the base section is disposed within the counterbored section of the hole of the base plate and the bottom section is disposed against a top surface of the base plate.

A diameter of the middle section can be dimensioned greater than a diameter of the intermediate section and greater than a diameter of the bottom section. A difference in the diameters of the middle and intermediate section and a difference in the diameter of the intermediate and bottom sections can form circumferential steps in the location pins. The diameter of the bottom section is dimensioned greater than a diameter of the intermediate section. Each of the location pins includes a hole formed axially in the base section to extending into the locations pins from the base section. The hole in each location pin can receive and engage with a fastener to secure the location pins to the base plate.

In accordance with embodiments of the present disclosure, an exemplary tool base assembly is provided. The tool base assembly includes a central support member, first and second lock plates, and a spring-loaded latch. The first and second lock plates are attached to bottom surfaces of the central support member. Each of the first and second lock plates includes a central opening formed therein. The spring-loaded latch is pivotably disposed relative to the central support member, a spring biasing the spring-loaded latch into a normally closed position.

The central opening of the first lock plate includes one or more vertical inner slots formed along a circumference of the central opening. The central opening of the second lock plate defines a uniform circumference without vertical inner slots. The tool base assembly includes first and second pivot plates attached to opposing sides of the central support member. The spring-loaded latch is pivotably attached to the second pivot plate.

In accordance with embodiments of the present disclosure, an exemplary method of using an adaptive tooling system is provided. The method includes providing an adaptive base plate assembly including a base plate with holes formed therein, and location pins attached to the base plate at the holes. The method includes providing a tool base assembly including a central support member, first and second lock plates each including a central opening formed therein, and a latch pivotably disposed relative to the central support member. The method includes positioning the tool base assembly over first, second and third location pins of the adaptive base plate assembly. The method includes at least partially inserting first and second location pins of the adaptive base plate assembly into the central opening of the first and second lock plates. The method includes engaging the latch with the third location pin to releasably engage the tool base assembly with the adaptive base plate assembly.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the adaptive tooling system, reference is made to the accompanying figures, wherein:

FIG. 12 is a perspective view of an exemplary adaptive base plate assembly in accordance with embodiments of the present disclosure;

FIG. 13 is a side view of an exemplary location pin in accordance with embodiments of the present disclosure;

FIG. 14 is a cross-sectional view of an exemplary location pin of FIG. 13;

DETAILED DESCRIPTION

Exemplary embodiments of the present disclosure provide an exemplary adaptive tooling system including an adaptive base plate assembly and a tool base assembly selectively engageable with the adaptive base plate assembly. The adaptive base plate assembly includes a matrix of holes each configured to detachably receive pins. The pins provide an interface for attaching one or more tool base assemblies to the adaptive base plate assembly in different positions. Different tooling or tooling components can be placed relative to the adaptive tooling system in a variety of orientations to support different shapes and/or sizes of a product being manufactured. If changes to a product occur or if different products are being manufactured, the adaptive tooling system allows for the adaptive base plate assembly and/or tool base assemblies to be reused and re-configured, reducing overall manufacturing costs. In some embodiments, engagement and disengagement of the tool base assembly relative to the adaptive base plate assembly can be performed manually, in an automated manner, combinations thereof, or the like. The adaptive tooling system thereby provides a variety of flexible, efficient and cost-effective tooling options in an engineering environment.

Figure 1:
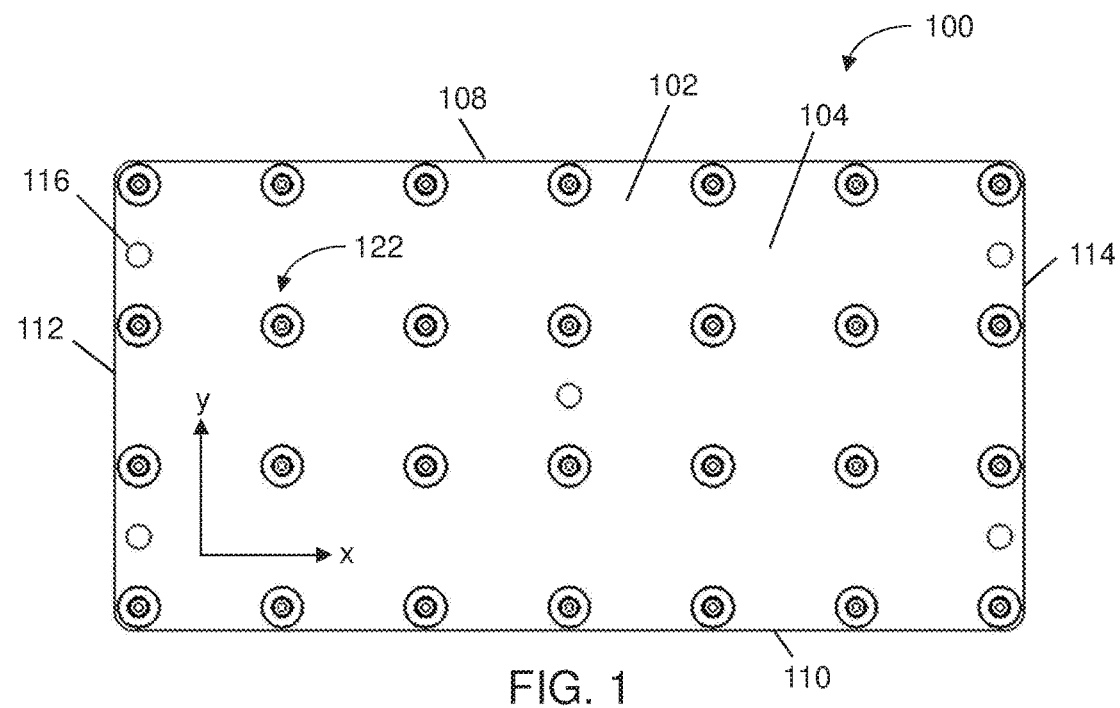
FIG. 1 is a top view of an exemplary adaptive base plate assembly in accordance with embodiments of the present disclosure.
Figure 2:
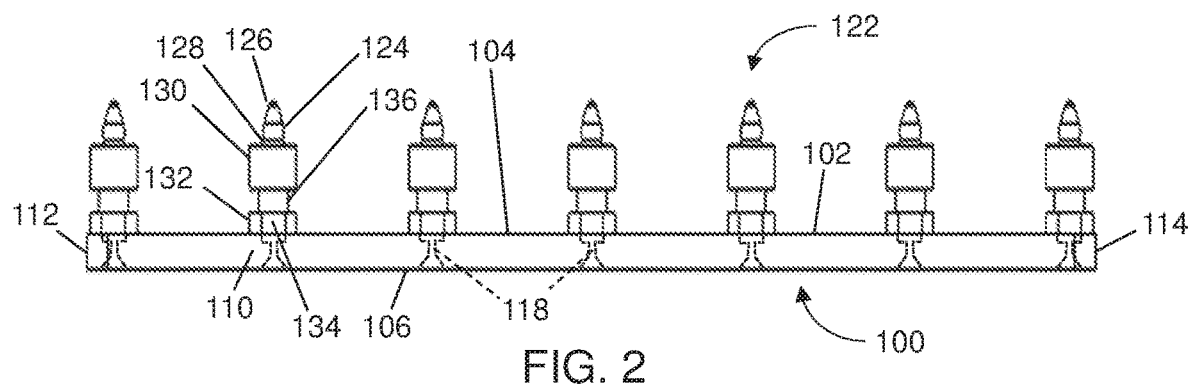
FIG. 2 is a side view of an exemplary adaptive base plate assembly in accordance with embodiments of the present disclosure.
Figure 3:
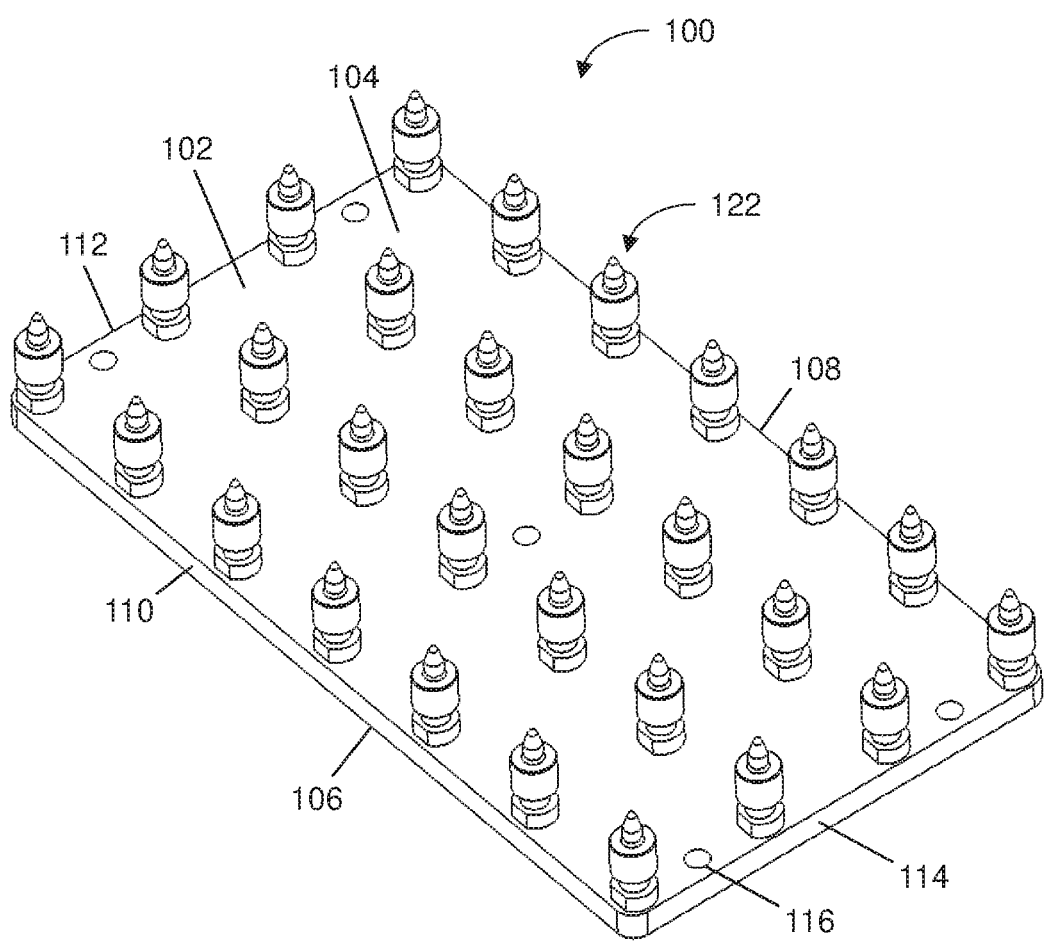
FIG. 3 is a top perspective view of an exemplary adaptive base plate assembly in accordance with embodiments of the present disclosure.
Figure 4:
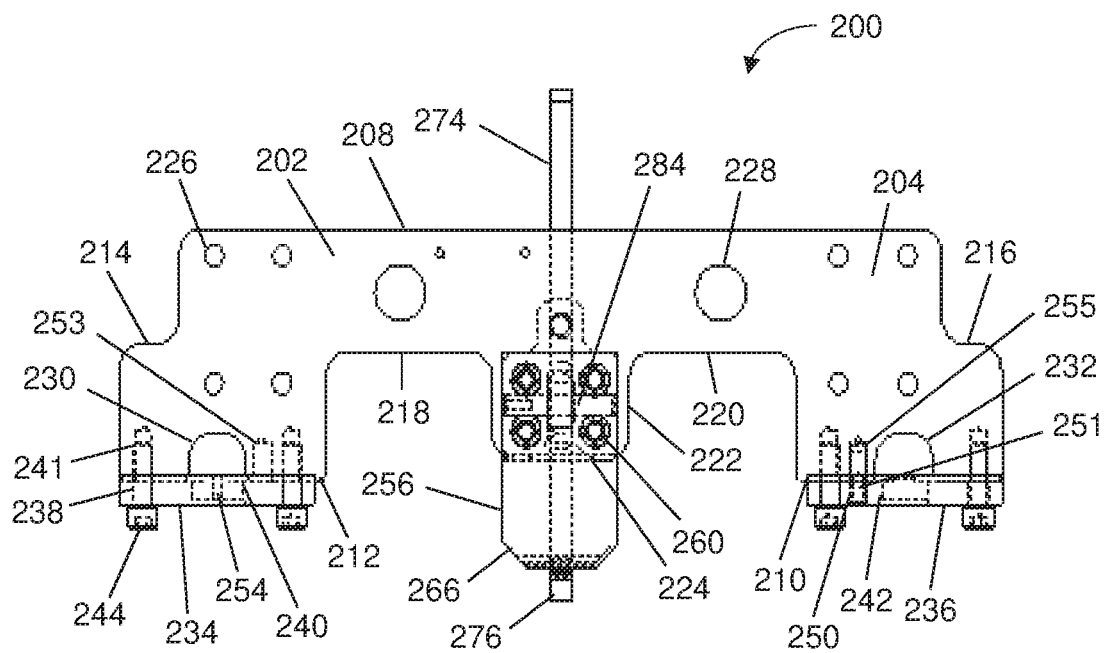
FIG. 4 is a front view of an exemplary tool base assembly in accordance with embodiments of the present disclosure.

FIGS. 1-3 are top, side and perspective views of an exemplary adaptive base plate assembly 100 (hereinafter "base plate assembly 100") of the present disclosure. The base plate assembly 100 includes a base plate 102 with a top surface 104 and a bottom surface 106 on opposing sides of the base plate 102. The base plate 102 generally defines a thin, planar/flat configuration. Although shown as substantially rectangular in shape, it should be understood that the base plate 102 can be in a variety of shapes, e.g., rectangular, square, octagonal, circular, oval, or the like. In some embodiments, the base plate 102 can have a thickness in the range of about 10 mm to about 30 mm or can have a thickness of about 20 mm, a length in the range of about 450 mm to about 1500 mm or can have a length of about 950 mm, and a width in the range of about 250 mm to about 750 mm or can have a width of about 500 mm. In some embodiments, the length of the base plate 102 can be about twice the width of the base plate 102.

The base plate 102 includes side edges 108-114, with edges 108, 110 on opposing sides of the base plate 102 from each other, and edges 112, 114 on opposing sides of the base plate 102 from each other. The side edges 108-114 define a perimeter and shape of the top surface 104 and bottom surface of the base plate 102. The base plate 102 can include one or more holes 116 formed therein and extending vertically between the top and bottom surfaces 104, 106 in a direction that is perpendicular to the top and bottom surfaces 104, 106. The holes 116 can be used to mount the base plate assembly 100 to a structure, e.g., a floor in a manufacturing area. In some embodiments, each of the holes 116 can have a diameter in a range of about 10 mm to about 40 mm or can have a diameter of about 25 mm. The base plate 102 includes a matrix of holes 118 formed therein and extending vertically between the top and bottom surfaces 104, 106 (see, e.g., detailed view of FIG. 9) such that the holes 118 can be aligned in rows and columns. The holes 118 can be machined and drilled at tight tolerances to ensure ease of assembly. In some embodiments, the distance between each of the holes 118 can be in a range of about 75 mm to about 225 mm or the distance between each of the holes 118 can be about 150 mm.

FIG. 12 shows another exemplary embodiment of an adaptive base plate assembly 500 (hereinafter "base plate assembly 500"). The base plate assembly 500 can be substantially similar in structure and function to the base plate assembly 100, except for the distinctions noted herein. FIG. 12 shows fasteners 502 (e.g., bolts) that can be passed through the holes 116 to mount the base plate assembly 500 to a structure, such as the floor of a manufacturing area. In some embodiments, the base plate assembly 500 can include a plate 504 disposed on the top surface 104 of the base plate assembly 500 between the pins 122. The plate 504 can include one or more holes formed therein and can be proximate to an edge of the base plate assembly 500 along a length of the base plate 102. In some embodiments, the plate 504 can be disposed proximate to and offset to one side of the mid-point of the length of the base plate 102. The base plate assembly 500 can include one or more holes 506 formed in the top surface 104 of the base plate 102 proximate to an edge opposing the plate 504. In some embodiments, the holes 506 can be disposed proximate to and offset to one side of the mid-point of the length of the base plate 102 such that the plate 504 and the holes 506 are generally aligned with each other across a width of the base plate 102. In some embodiments, the plate 504 can be used as an identification plate to identify the components associated with the base plate assembly 500. In some embodiments, the plate 504 and/or the holes 506 can be used as reference points for robot programming.

Figure 9:
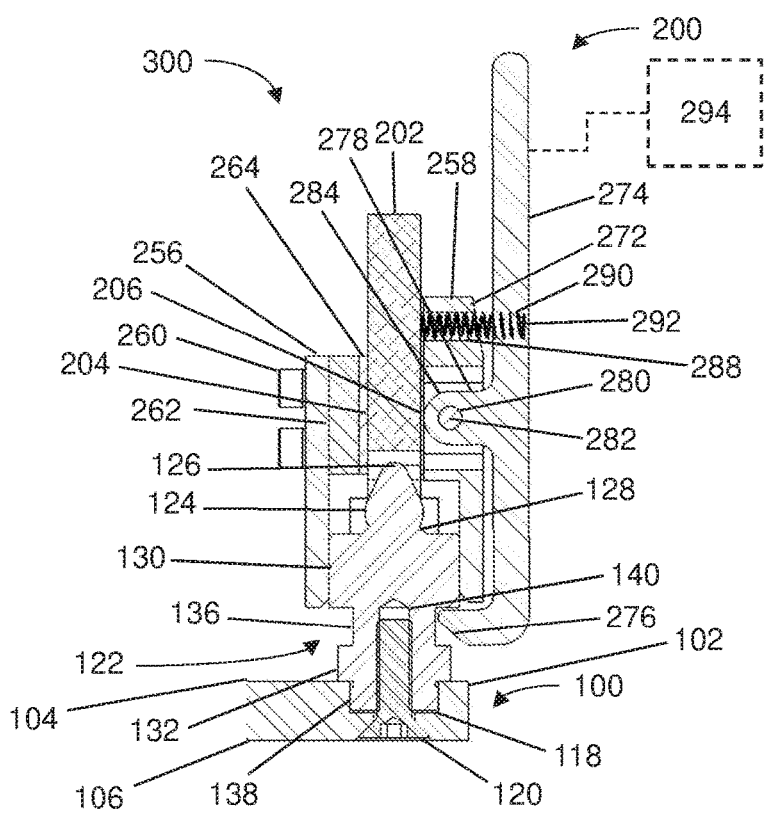
FIG. 9 is a detailed, cross-sectional side view of an exemplary adaptive tooling system in accordance with embodiments of the present disclosure, including engagement of a tool base assembly with an adaptive base plate assembly.

With reference to FIGS. 1-3 and 9, as shown in FIG. 9, each hole 118 can be counterbored at the top surface 104, forming a flat-bottomed inner surface or step and substantially vertical inner walls of the hole 118, and each hole 118 can be countersunk at the bottom surface 106 to accommodate the head of a fastener 120. In some embodiments, each hole 118 can have a diameter in a range of about 5 mm to about 25 mm or can have a diameter of about 14 mm, and the countersunk section of the hole 118 can have a larger diameter in the range of about 10 mm to about 30 mm or a diameter of about 27 mm. In some embodiments, the diameter of the countersunk section can be about twice the diameter of the other section of the hole 118. The matrix of holes 118 can be spaced from each other by predetermined, substantially equal distances in both the x-direction and y-direction (see, e.g., FIG. 1). In some embodiments, the spacing between the holes 118 in the x-direction can be different from the spacing between the holes 118 in the y-direction.

Each hole 118 is configured to at least partially receive therein a location pin 122. The number of holes 118 in the base plate 102 and the number of pins 122 the base plate 102 can be dependent on the dimensions of the base plate 102 and the desired dimensions of the spacing between the holes 118. With reference to FIGS. 1-3 and the detailed view of FIG. 9, each pin 122 includes a top rounded section 124 having an apex that defines an uppermost point 126 of the pin 122. The middle portion of the rounded section 124 can define the largest diameter of the rounded section 124, with the upper portion tapering to the point 126 at the apex and the lower portion tapering to a smaller diameter section 128. In some embodiments, the smaller diameter portion 128 can be in the form of a conical or tapered section that connects the top rounded section 124 with a middle section 130 (see, e.g., FIGS. 13 and 14 showing an alternative embodiment of a location pin 510).

The pin 122 includes the middle section 130 defining a cylindrical configuration and having a diameter dimensioned greater than the diameter of the rounded section 124. The pin 122 includes a bottom section 132 defining a cylindrical configuration with flattened sides 134, and having a diameter dimensioned greater than the diameter of the middle portion of the rounded section 124. In some embodiments, the diameter of the bottom section 132 can be dimensioned smaller than the diameter of the middle section 130. In some embodiments, the diameter of the bottom section 132 can be dimensioned substantially equal to the diameter of the middle section 130. The middle and bottom sections 130, 132 are separated by an intermediate section 136. The diameter of the section 136 can be dimensioned greater than the diameter of the middle portion of the rounded section 124 and dimensioned smaller than the diameter of the middle section 130 and the bottom section 132.

The pin 122 includes a base section 138 defining a cylindrical configuration, and having a diameter dimensioned less than the middle and bottom sections 130, 132, respectively. The diameter of the base section 138 can be substantially equal to the diameter of the intermediate section 136. The diameter of the base section 138 can be complementary to the diameter of the counterbored holes 118 so that the base section 138 can be received by and fit within the countersunk section of the counterbored holes 118, but is dimensioned so that base section 138 is larger than the smaller diameter of the counterbored holes 118 such that the base section 138 does not fit within the portion of the counterbored holes 118 having the smaller diameter. In some embodiments, a connecting section 512 can connect the base section 138 with the bottom section 132 (see, e.g., FIGS. 13 and 14 showing an alternative embodiment of a location pin 510). The diameter of the connecting section 512 can be smaller than the diameter of the base section 138 and the bottom section 132.

In some embodiments, the top rounded section 124 can have a diameter in a range of about 10 mm to about 30 mm or can have a diameter of about 20 mm. In some embodiments, the smaller diameter section 128 can have a diameter in a range of about 10 mm to about 30 mm or a diameter of about 20 mm. In some embodiments, the middle section 130 can have a diameter in a range of about 35 mm to about 55 mm or a diameter of about 44 mm. In some embodiments, the intermediate section 136 can have a diameter in a range of about 20 mm to about 40 mm or a diameter of about 28 mm. In some embodiments, the bottom section 132 can have a diameter in a range of about 35 mm to about 55 mm or a diameter of about 44 mm. In some embodiments, the base section 138 can have a diameter in a range of about 20 mm to about 40 mm or a diameter of about 30 mm. In some embodiments, the connecting section 512 can have a diameter in a range of about 20 mm to about 40 mm or a diameter of about 28 mm.

In some embodiments, the height of the pin 122 as measured between the point 126 and the base section 138 can be in a range of about 60 mm to about 110 mm or can have a height of about 86 mm. In some embodiments, the height of the base section can be in a range of about 5 mm to about 20 mm or can have a height of about 10 mm. In some embodiments, the height of the connecting section 512 can be in a range of about 1 mm to about 5 mm or a height of about 2 mm. In some embodiments, the height of the bottom section 132 can be in a range of about 5 mm to about 20 mm or can have a height of about 12 mm. In some embodiments, the height of the intermediate section 136 can be in a range of about 5 mm to about 20 mm or can have a height of about 13 mm. In some embodiments, the height of the middle section 130 can be in a range of about 10 mm to about 40 mm or can have a height of about 25 mm. In some embodiments, the height of the smaller diameter portion 128 can be in a range of about 5 mm to about 20 mm or can have a height of about 10 mm. In some embodiments, the height of the top rounded section 124 can be in a range of about 10 mm to about 30 mm or can have a height of about 16 mm.

The pin 122 therefore defines multiple stepped areas (e.g., circumferential steps) between the top and bottom of the pin 122. For example, the difference in the diameters of the middle section 130 the intermediate section 136 can form the circumferential step and the difference in the diameters of the intermediate section 136 and the bottom section 132 can form a circumferential step to create a recessed area between the middle and bottom sections 130, 132. The pin 122 includes a tapped hole 140 extending axially from the bottom of the base section 138 a partial distance into the body of the pin 122.

During assembly, the base section 138 can be inserted into the counterbored portion of the hole 118 such that the bottom surface of the bottom section 132 is disposed against the top surface 104 of the base plate 102. A fastener 120 can be passed through the hole 118 from the bottom surface 106 of the base plate 102, and threaded into the hole 140 in the pin 122. The flattened sides 134 of the pin 122 can be used to prevent rotation of the pin 122 (e.g., with a wrench) during engagement of the fastener 120 with the pin 122. Tightening of the fastener 120 relative to the pin 122 detachably engages the pin 122 with the base plate 102. Although shows as having a pin 122 in each of the holes 118, it should be understood that a fewer number of pins 122 can be used based on the tooling components being implemented. The vertically-oriented position of the pins 122 ensures the same pitch such that the tool base assembly 200 discussed below can be attached to the pins 122 in any desired position.

While the various sections of the pins 122 have been described as being cylindrical, in an example embodiment, exemplary embodiments of the pins 122 can have different shapes, such as rectangular prism, triangular prism, pentagonal prism, hexagonal prism, heptagonal prism, octagonal prism, and so on.

FIGS. 4-7 are front, side, top and bottom perspective views of an exemplary tool base assembly 200 (hereinafter "base assembly 200") of the present disclosure. FIG. 9 also provides a detailed cross-sectional view of the base assembly 200 as engaged with the base plate assembly 100. As discussed below, the base assembly 200 is configured to be selectively attached to the base plate assembly 100. Tooling components (see, e.g., FIGS. 10 and 11), can be attached to one or more of the base assemblies 200 based on the needs during the manufacturing process. The tooling components vary depending on the product being manufactured, and can each be engageable with the base assembly 200.

Figure 15:
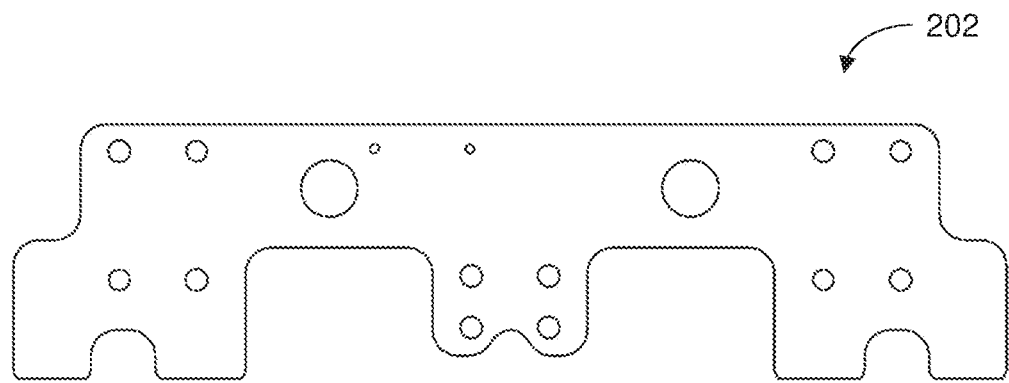
FIG. 15 is a front view of an exemplary central support member of a base assembly in accordance with embodiments of the present disclosure.
Figure 16:
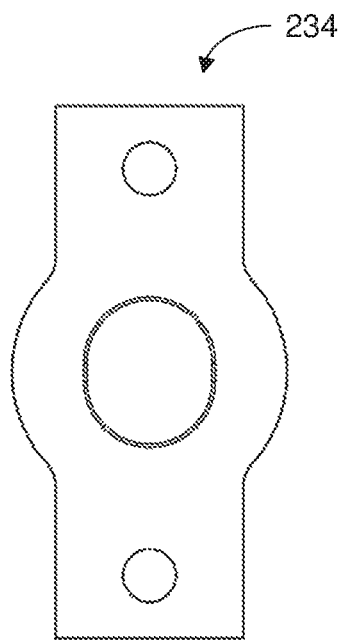
FIG. 16 is a bottom view of an exemplary lock plate of a base assembly in accordance with embodiments of the present disclosure.
Figure 17:
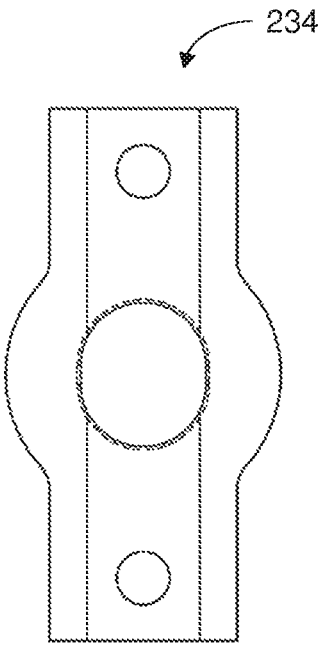
FIG. 17 is a top view of an exemplary lock plate of FIG. 16.
Figure 18:
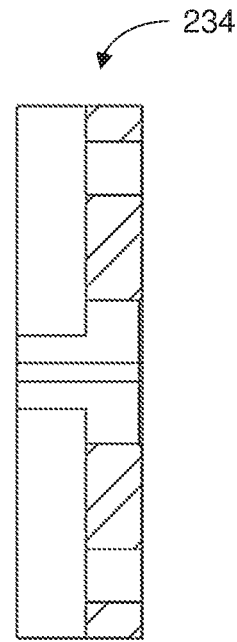
FIG. 18 is a cross-sectional view of an exemplary lock plate of FIG. 16.
Figure 19:
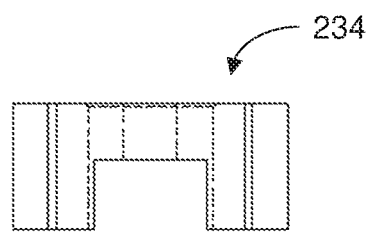
FIG. 19 is a side view of an exemplary lock plate of FIG. 16.
Figure 20:
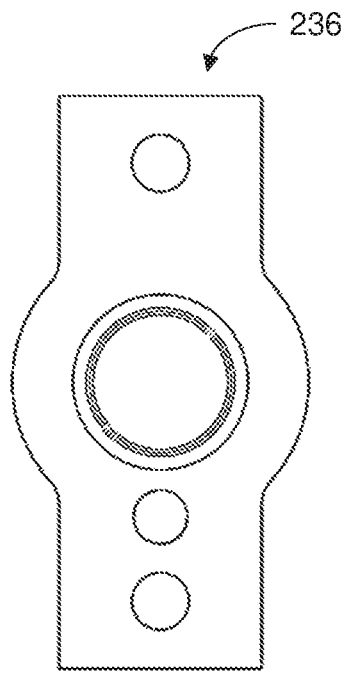
FIG. 20 is a bottom view of an exemplary lock plate of a base assembly in accordance with embodiments of the present disclosure.
Figure 21:
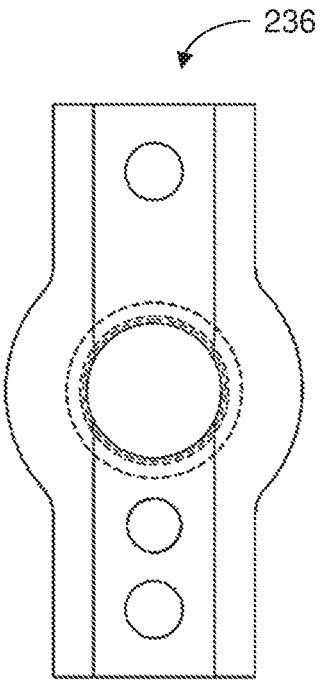
FIG. 21 is a top view of an exemplary lock plate of FIG. 20.
Figure 22:
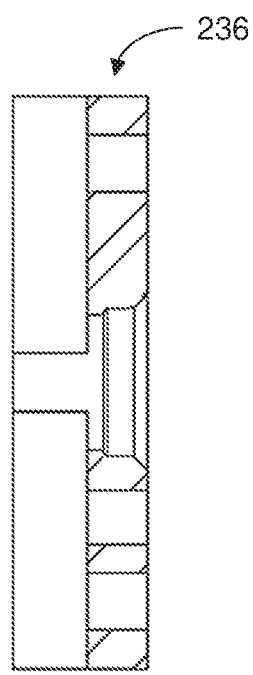
FIG. 22 is a cross-sectional view of an exemplary lock plate of FIG. 20.
Figure 23:
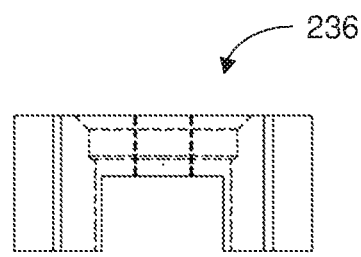
FIG. 23 is a side view of an exemplary lock plate of FIG. 20.

The base assembly 200 includes a central support member 202 that defines the body of the base assembly 200. FIG. 15 provides a front view of the central support member 202. With reference to FIGS. 4-7 and 15, in a non-limiting example embodiment, the central support member 202 can define substantially planar/flat opposing sides 204, 206. In some embodiments, the central support member 202 can have an overall height in a range of about 50 mm to about 150 mm or an overall height of about 100 mm, an overall length in a range of about 325 mm to about 425 mm or an overall length of about 385 mm, and an overall thickness in a range of about 10 mm to about 30 mm or an overall thickness of about 18 mm. The top surface 208 and bottom surfaces 210, 212 of the support member 202 define substantially planar/flat and parallel surfaces. The support member 202 includes projections 214, 216 on either side of the support member 202 that extend beyond the side surfaces of the upper half of the support member 202. The projections 214, 216 include the respective bottom surfaces 210, 212.

The support member 202 can include U-shaped cutouts 218, 220 on either side of a central projection 222. The bottom surface 224 of the central projection 222 is disposed at a plane vertically offset from and parallel to the plane extending through the bottom surfaces 210, 212. The support member 202 can include one or more transverse holes 226, 228. The holes 226, 228 can be used to assist in mounting tooling components to the base assembly 200. The support member 202 includes U-shaped cutouts 230, 232 extending upwardly at the bottom surfaces 210, 212 of each of the projections 214, 216. During engagement with the base plate assembly 100, the cutouts 230, 232 provide clearance for receiving the upper sections of the pins 122. The support member 202 includes two tapped holes 241 disposed on either side of the U-shaped cutouts 230, 232. The support member 202 includes openings 253, 255 formed in the bottom surfaces 210, 212 of each of the projections 214, 216. The openings 253, 255 can be formed between the U-shaped cutouts 230, 232 and one of the tapped holes 241. The support member 202 can include slots configured to receive identification information that can be helpful during the manufacturing process. The slots can be machined into the support member 202 (e.g., on one or more of the side surfaces, on the top surface 208, on the end faces, combinations thereof, or the like).

The base assembly 200 includes lock plates 234, 236 (e.g., slotted lock plate and circular lock plate, respectively) detachably mounted to the bottom surfaces 210, 212 of the support member 202. FIGS. 16-19 show bottom, top, cross-sectional and side views of the lock plate 234, and FIGS. 20-23 show bottom, top, cross-sectional and side views of the lock plate 236. With reference to FIGS. 4-7 and 16-23, the lock plates 234, 236 can each define a substantially rectangular block configuration. Each lock plate 234, 236 includes two mounting holes 238 extending through the lock plate 234, 236 and disposed on either side of a central opening 240, 242. In some embodiments, the diameter of the central openings 240, 242 can be in a range of about 10 mm to about 30 mm or a diameter of about 20 mm. In some embodiments, the central opening 240 can have an oval configuration with a radius in a range of 10 mm to about 30 mm or a radius of about 22 mm (see, e.g., FIGS. 16-17). The lock plates 234, 236 can be detachably mounted to the bottom surfaces 210, 212 by fasteners 244 passed through the mounting holes 238 and engaged with corresponding tapped holes 241 formed in the bottom surfaces 210, 212. In some embodiments, the diameter of the mounting holes 238 can be in a range of about 5 mm to 15 mm or can have a diameter of about 8.5 mm.

The lock plate 236 can include a machined slot or opening 250 between one of the mounting holes 238 and the central hole 242. In some embodiments, the opening 250 can have a diameter in a range of about 5 mm to 15 mm or can have a diameter of about 8 mm. The lock plate 234 can be formed without an opening 250. When assembled with the support member 202, the opening 250 corresponds with the opening 255 (or opening 253) formed in the projections 214, 216. Each projection 214, 216 includes the opening 253, 255, allowing the lock plate 236 to be secured to either one of the projections 214, 216. The opening 250 can receive an extractable dowel pin 251 that inserts through the opening 250 and into the opening 255 in the support member 202. The dowel pin 251 acts as a locating reference for the support member 202 by precisely positioning the central opening 242 (and the support member 202) in an x-axis and/or y-axis direction relative to the base plate assembly 100. The central opening 242 of the lock plate 236 can act as the datum hole for the base assembly 200 by receiving and engaging with pin 122. The central opening 242 of the lock plate 236 can define a substantially circular configuration and substantially continuous circumference. In order to keep the lock plate 236 in a controlled position relative to support member 202, and thereby maintain the position of the support member 202 relative to the base plate assembly 100, the dowel pin 251 can be extended from the lock plate 236 and positioned against the upper surface of the middle section 130 of the pin 122 (see, e.g., FIG. 8). By engaging the pin 122 with both the central opening 242 and the dowel pin 251, the position of the support member 202 can be maintained relative to the base plate assembly 100, allowing for accurate positioning of any support features fixed to the support member 202 and/or accurate location by robots of the base assembly 200. For example, such engagement with the pin 122 reduces or prevents linear motion of the base assembly 200 relative to the base plate assembly 100.

The central opening 240 of the lock plate 234 can include machined slots 252, 254 extending the height of the opening 240 (e.g., one or more vertical slots formed along the circumference of the opening). The slots 252, 254 allow for tolerance stack-up between the pitch of the pins 122. In particular, during engagement of the base assembly 200 with the base plate assembly 100, the pins 122 of the base plate assembly 100 are inserted into respective central openings 240, 242. If the pitch of one or more of the pins 122 is not exactly vertical to the base plate 102, the slots 252, 254 ensure that the pin 122 will not jam within the opening 240 during engagement and/or disengagement. In some embodiments, both central openings 240, 242 can include the machines slots 252, 254 to assist with engagement and disengagement of the pins 122 relative to the lock plates 134, 136.

Figure 24:
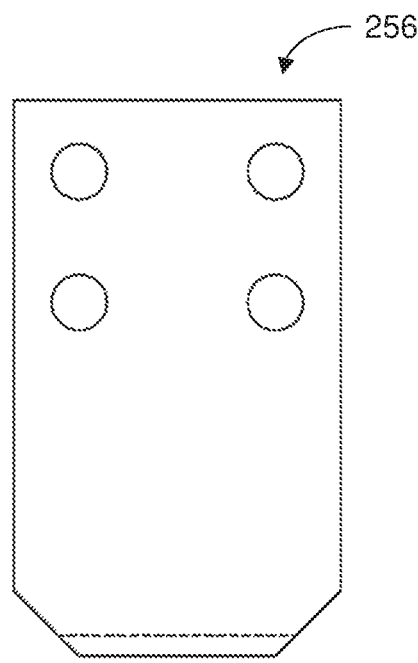
FIG. 24 is a front view of a first pivot plate in accordance with embodiments of the present disclosure.
Figure 25:
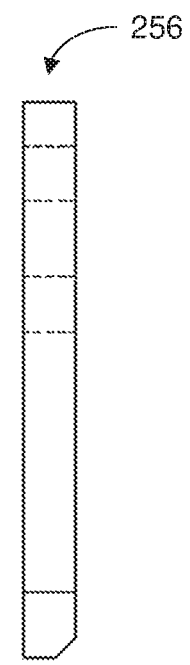
FIG. 25 is a side view of a first pivot plate of FIG. 24.
Figure 26:
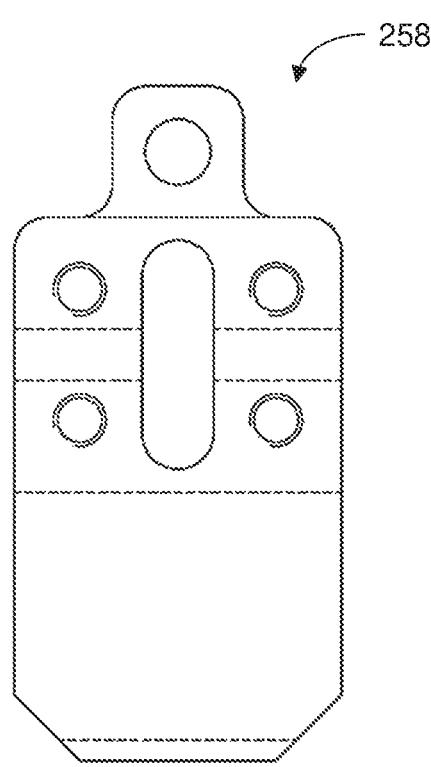
FIG. 26 is a front view of a second pivot plate in accordance with embodiments of the present disclosure.
Figure 27:
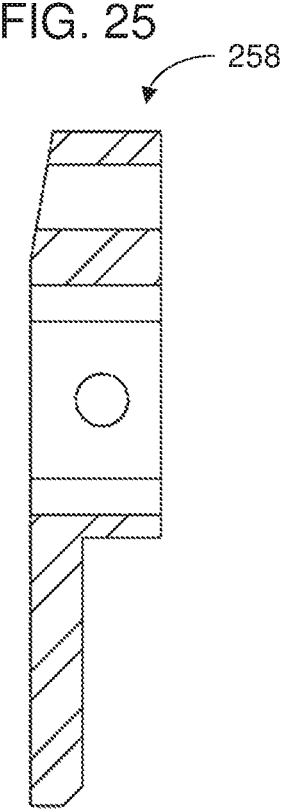
FIG. 27 is a cross-sectional view of a second pivot plate of FIG. 26.

The base assembly 200 includes first and second pivot plates 256, 258 disposed on opposing sides of the support member 202. FIGS. 24-25 show front and side views of the first pivot plate 256, and FIGS. 26-27 show front and cross-sectional views of the second pivot plate 258. In some embodiments, the pivot plate 256 can have an overall height in a range of about 50 mm to about 125 mm or an overall height of about 85 mm, an overall width in a range of about 25 mm to about 75 mm or an overall width of about 50 mm, and an overall thickness of in a range of about 5 mm to 15 mm or can have a thickness about 8 mm. In some embodiments, the overall height of the pivot plate 256 can be greater than or equal to one and half times the overall width of the pivot plate 256. In some embodiments, the pivot plate 258 can have an overall height of in a range of about 50 mm to about 150 mm or an overall height of about 103 mm, an overall width in a range of about 25 mm to about 75 mm or can have an overall width of about 50 mm, and an overall thickness of about 20 mm. In some embodiments, the overall height of the pivot plate 258 can be about twice the overall width of the pivot plate 258.

Figure 30:
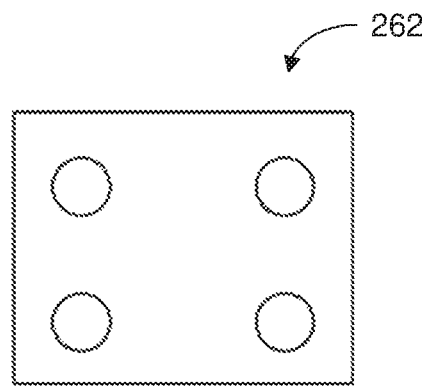
FIG. 30 is a front view of a spacer element in accordance with embodiments of the present disclosure.
Figure 31:
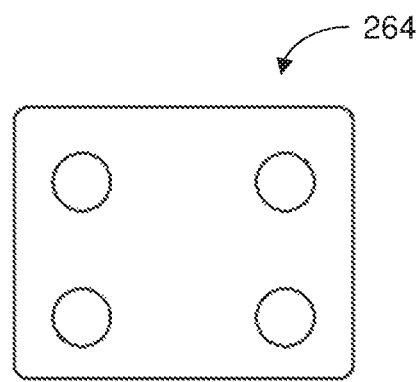
FIG. 31 is a front view of a spacer element in accordance with embodiments of the present disclosure.

With reference to FIGS. 4-7 and 24-27, the pivot plates 256, 258 can be attached to the central projection 222 of the support member 202 with fasteners 260 (e.g., four fasteners 260 extending through holes in the pivot plate 256, through corresponding holes in the central protrusion 222, and engaging in tapped holes in the pivot plate 258. In some embodiments, the base assembly 200 includes one or more spacers 262, 264 disposed between the pivot plate 256 and the central projection 222 (see also, e.g., FIGS. 30 and 31). In some embodiments, the spacer element 262 can have an overall height in a range of about 20 mm to about 60 mm or can have an overall height of about 40 mm, an overall width that is greater than the overall height, where the overall width can be in a range of about 25 mm to about 75 mm or can be about 50 mm, and an overall thickness in a range of about 5 mm to about 15 mm or can have an overall thickness of about 10 mm. In some embodiments, the spacer element 264 can have an overall height in a range of about 20 mm to about 60 mm or can have an overall height of about 40 mm, an overall width that is greater than the overall height, where the overall width can be in a range of about 25 mm to about 75 mm or can be about 50 mm, and an overall thickness in a range of about 1 mm to about 5 mm or an overall thickness of about 3 mm. The spacers 262, 264 include corresponding holes for the fasteners 260, and are dimensions such that the bottom surface of the spacers 262, 264 aligns substantially with the bottom surface 224 of the central protrusion 222. The spacers 262, 264 offset the position of the pivot plate 256 from the central protrusion 222. In some embodiments, the spacers 262, 264 can be used to save machining material, thereby providing a cost-effective product. In some embodiments, the pivot plate 256 can define an L-shaped configuration (similar to the pivot plate 258) and the base assembly 200 can be assembled without the use of spacers 262, 264.

The pivot plate 256 defines a substantially planar/flat, rectangular configuration, and can include chamfered edges 266 at the bottom surface. In some embodiments, the inner edge at the bottom surface can also be chamfered to assist in engagement with the pin 222. The pivot plate 256 length is dimensioned such that the plane at the bottom surface of the pivot plate 256 is vertically offset lower than the plate at the bottom surfaces of the lock plates 234, 236.

The pivot plate 258 defines a substantially L-shaped configuration, with a thicker upper portion 268 and a thinner lower portion 270 extending downwardly form the upper portion 268. One side of the upper portion 268 can be substantially flat/planar and is positioned against the planar surface of the support member 202. The opposing side of the upper portion 268 includes a chamfered or tapering section 272 at or near the top surface, such that the upper portion 268 is smaller in thickness at the top surface as compared to lower sections of the upper portion 268.

The lower portion 270 defines a substantially planar/flat square or rectangular configuration, similar to the pivot plate 256. For example, the edges at the bottom surface of the lower portion 270 can also be chamfered, and the inner edge at the bottom surface can be chamfered to assist in engagement with the pin 222. The distance between the inner surfaces of the pivot plate 256 and the lower portion 270 of the pivot plate 258 is dimensioned complementary to the diameter or width of the middle section 130 of the pin 122.

Figure 28:
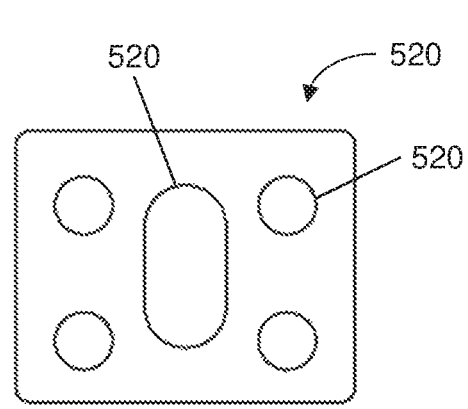
FIG. 28 is a front view of a spacer element in accordance with embodiments of the present disclosure.

In some embodiments, the base assembly 200 can include a spacer element 520 shown in FIG. 28 disposed between the pivot plate 248 and the central support member 202. The spacer element 520 can include holes 522 corresponding with the holes of the pivot plate 258 and the central support member 202. The spacer element 520 can include an elongated slot 524 corresponding with the central slot of the pivot plate 258. In some embodiments, the spacer element 520 can have an overall height in a range of about 20 mm to about 60 mm or can have an overall height of about 40 mm, an overall width that is greater than the overall height, where the overall width can be in a range of about 25 mm to about 75 mm or can be of about 50 mm, and an overall thickness of about 1 mm.

Figure 29:
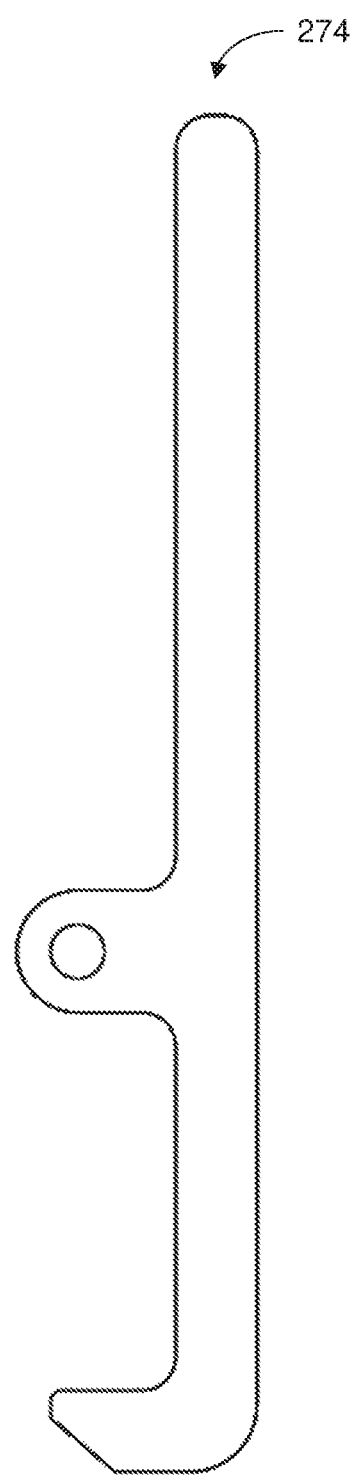
FIG. 29 is a side view of a latch in accordance with embodiments of the present disclosure.

The base assembly 200 includes a latch 274 pivotally mounted to the pivot plate 258. FIG. 29 is a side view of the latch 274. In some embodiments, the latch 274 can have an overall length in a range of 100 mm to about 300 mm or can have an overall length of about 200 mm, an overall width in a range of about 15 mm to about 45 mm or can have an overall width of about 30.5 mm, and an overall thickness in a range of about 5 mm to about 15 mm or can have an overall thickness of about 10 mm. In some embodiments, the overall height of the latch 274 can be greater than three times the overall width of the latch 274. With reference to FIGS. 4-7 and 29, the latch 274 includes an elongated, narrow body having an overall width dimensioned smaller than the width of the pivot plates 256, 258, and an overall length dimensioned greater than the length of the pivot plates 256, 258 and the support member 202. The latch 274 can define a substantially L-shaped configuration. The upper portion of the latch 274 defines the lever for operating the latch 274. The lower portion of the latch 274 includes a hook-like projection 276 that extends substantially perpendicularly from one surface of the body of the latch 274 towards the pivot plate 256. In some embodiments, the bottom edge of the projection 276 can be chamfered.

The latch 274 includes a pivot flange 278 extending substantially perpendicularly from the body of the latch 274 in the same, parallel direction as the projection 276. The pivot flange 278 can be disposed halfway or substantially halfway between the projection 276 and an upper end of the latch 274. In some embodiments, the pivot flange 278 can define a substantially rounded or curved configuration. The pivot flange 278 includes a transverse opening 280 configured to receive a pivot pin 282 therethrough. The pivot plate 258 includes a slot 284 formed in the planar/flat section of the upper portion 268 (e.g., on the same side as the tapering section 272) configured to accommodate the pivot flange 278 therein.

The pivot plate 258 includes transverse openings 286 on either side of the pivot plate 258 configured to receive the pivot pin 282 therethrough, thereby engaging the latch 274 with the pivot plate 258. The pivot plate 258 includes an opening 288 in the tapered section 272, and the latch 274 includes a corresponding opening 290 extending at least partially through the thickness of the latch 274. The openings 288, 290 are configured to receive and engage with a compression spring 292.

Figure 5:
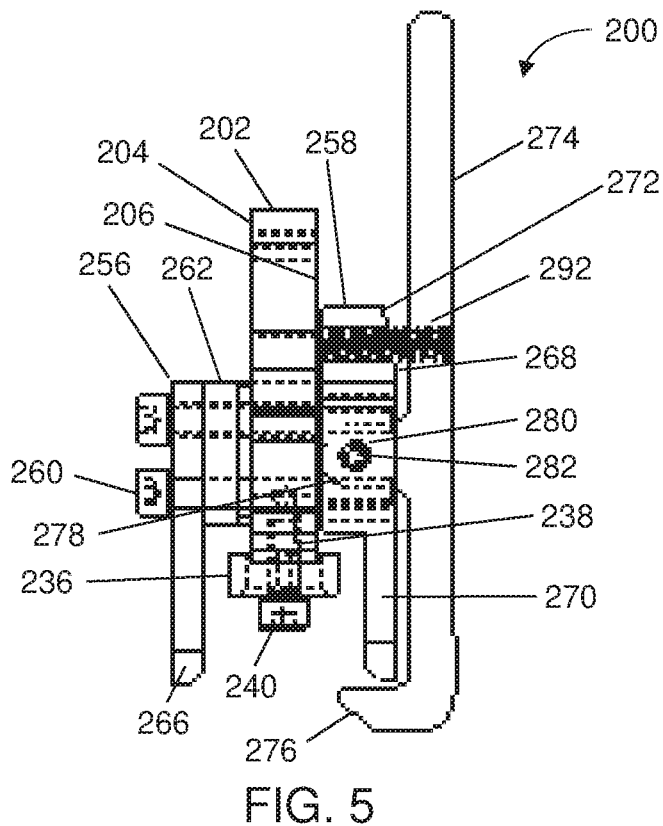
FIG. 5 is a side view of an exemplary tool base assembly in accordance with embodiments of the present disclosure.
Figure 6:
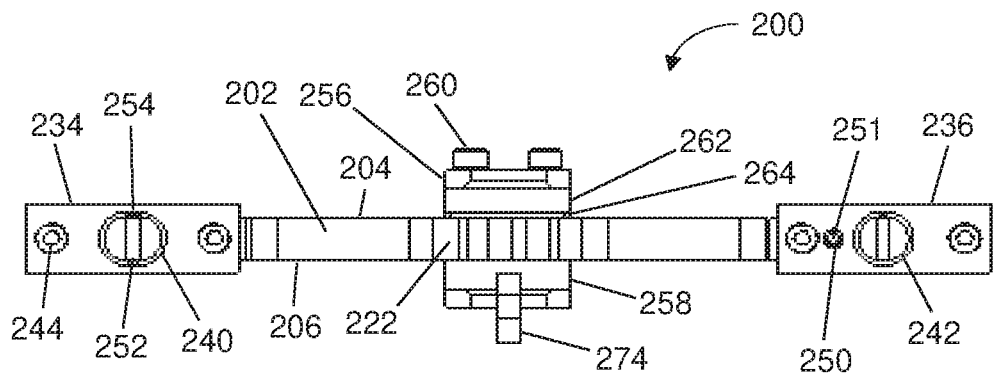
FIG. 6 is a bottom view of an exemplary tool base assembly in accordance with embodiments of the present disclosure.
Figure 7:
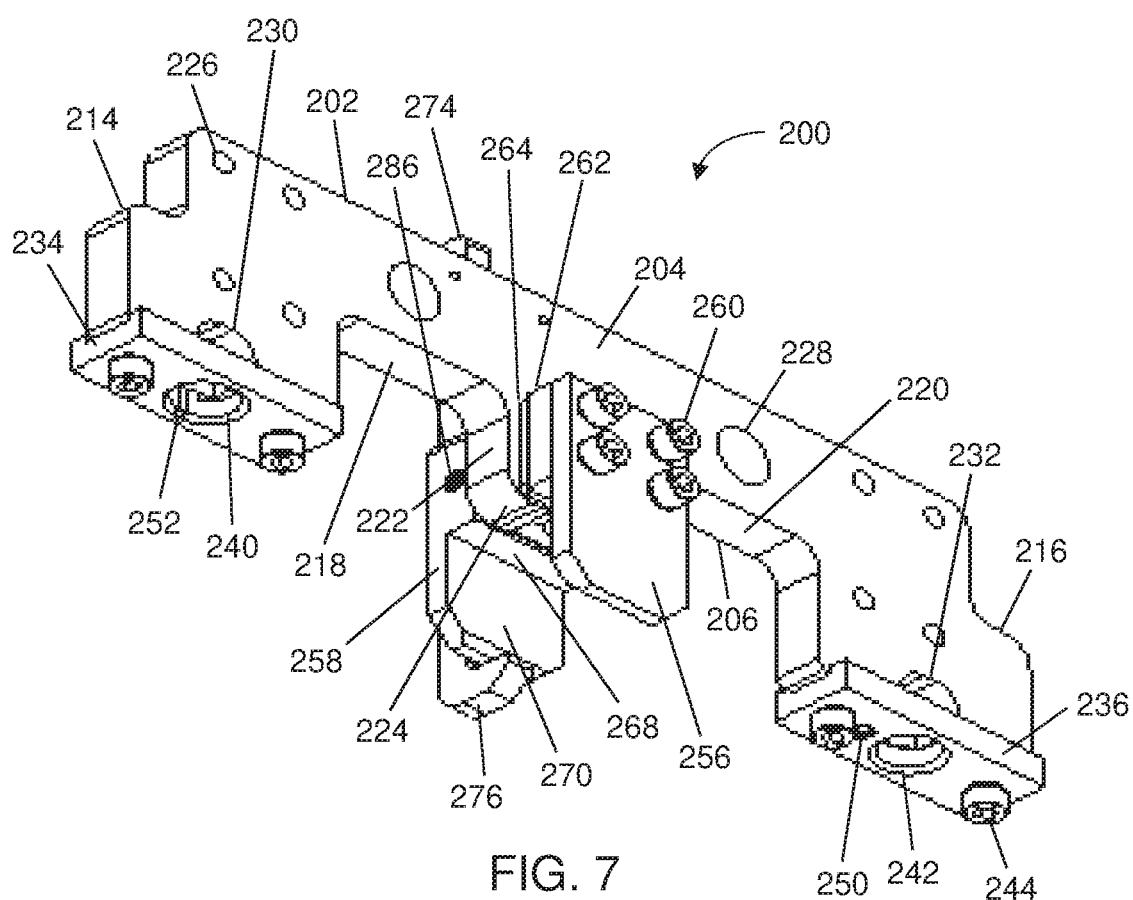
FIG. 7 is a bottom perspective view of an exemplary tool base assembly in accordance with embodiments of the present disclosure.

Due to the bias of the spring 292, the normal position of the spring-loaded latch 274 can be in the substantially vertical position shown in FIGS. 4-7 and 9 (e.g., the latch 274 surface positioned in a spaced manner from the tapered surface 272 of the pivot plate 258). Imparting a force on the upper or lever portion of the latch 274 compresses the spring 292 and pivots the latch 274 about a pivot axis defined by the pin 282. The tapered section 272 provides clearance for the latch 274 to pivot up to and against the tapered section 272 (e.g., the open position of the latch 274). The force imparted on the latch 274 for pivoting the latch 274 can be applied manually or in an automated manner (e.g., a structure 294 programmed to impart a force on the latch 274). For example, a lever arm can be programmed to selectively impart a force on the latch 274. Upon removal of the force on the latch 274, the bias of the spring 292 returns the latch 274 to the normal position (e.g., the closed position). In the closed position, as shown in FIGS. 5 and 9, the projection 276 extends beyond a plane defined by the inner surface of the pivot plate 258 (e.g., below a space between the pivot plates 256, 258).

Figure 8:
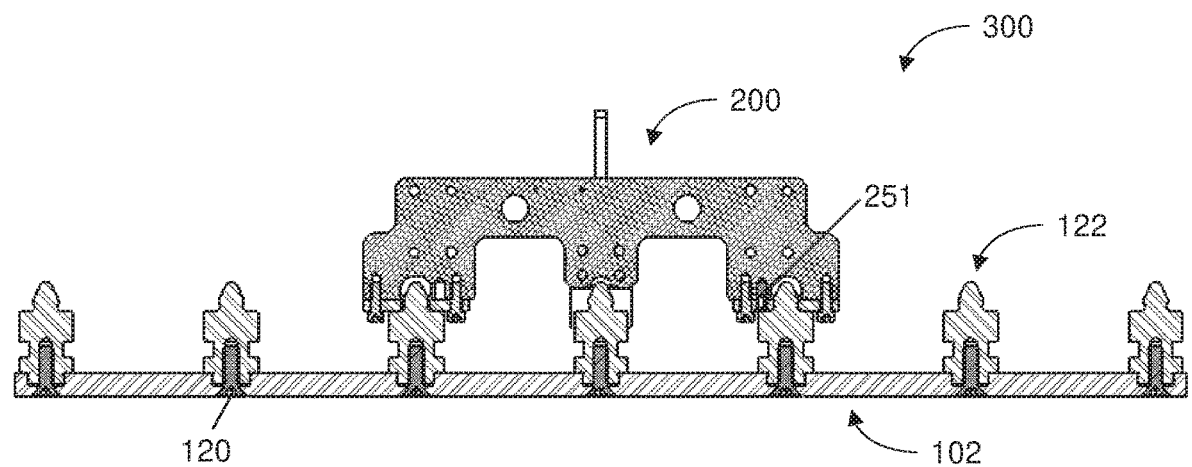
FIG. 8 is a cross-sectional side view of an exemplary adaptive tooling system in accordance with embodiments of the present disclosure, including engagement of a tool base assembly with an adaptive base plate assembly.

FIGS. 8 and 9 are cross-sectional and detailed views of an adaptive tooling system 300 (hereinafter "system 300") of the present disclosure. The system 300 includes the base plate assembly 100 and the base assembly 200 adapted to engage with the base plate assembly 100. During engagement of the base assembly 200 with the base plate assembly 100, three pins 122 are selected. In some embodiments, the selected pins 122 can be adjacently disposed relative to each other (e.g., as regulated by the spacing of the holes 118) and aligned along a single plane. In some embodiments, the selected pins 122 can be pins 122 spaced from each other and aligned along a single plane. The base assembly 200 is positioned over the pins 122 and lowered such that the rounded section 124 of the outer pins 122 enters into the central openings 240, 242 of the lock plates 234, 236. The diameter of the rounded sections 124 can be dimensioned substantially complementary to the diameter of the central openings 240, 242. In some embodiments, a friction fit between the widest portion of the rounded sections 124 and the central openings 240, 242 can be used to prevent undesired shifting or movement of the pin 122 within the lock plate 234, 236.

Upon lowering the base assembly 200 onto the base plate assembly 100, the pivot plates 256, 258 slide over and are disposed on opposing sides of the middle section 130 of the central pin 122. The inner surfaces of the pivot plates 256, 258 are disposed against the outer surfaces of the middle section 130 of the pin 122 to prevent pivoting action (e.g., side-to-side movement) of the base assembly 200 relative to the base plate assembly 100. During lowering of the base assembly 200 onto the base plate assembly 100, the latch 274 can be pivoted at the pin 282 to move the projection 276, thereby clearing the path for positioning the pivot plates 256, 258 around the pin 122.

After the pivot plates 256, 258 have been lowered into the desired position, the latch 274 can be released. The spring 292 biases the latch 274 into the closed position, and positions at least the endpoint of the projection 276 extends into a recessed area defined by the intermediate section 136 and abuts against the bottom surface or edge of the middle section 130 of the pin 122. Engagement of the projection 276 with the step between the middle section 130 and the intermediate section 136 of the pin 122 prevents the base assembly 200 from being upwardly lifted and disengaged from the base assembly 100. The latch 274 (in combination with the lock plates 234, 236) therefore acts as a locking mechanism to maintain the base assembly 200 engaged with the base plate assembly 100. The force or strength of the spring 292 can be sufficiently strong to prevent inadvertent pivoting and disengagement of the latch 274 relative to the pin 122. In some embodiments, an additional locking feature can be used to prevent inadvertent pivoting and disengagement of the latch 274 relative to the pin 122.

For removal of the base assembly 200, the latch 274 is pivoted into the open position to disengage the projection 276 from the pin 122, and the base assembly 200 can be lifted upwardly away from the base plate assembly 100. As such, if tooling components are to be changed and/or if a different position of the base assembly 200 is desired, the base assembly 200 can be moved and engaged with the base plate assembly 100 in a controlled position. The base assembly 200 can be used for different tooling components, ensuring that the entire system 300 does not need to be replaced for manufacturing different products. Instead, the base assembly 200 can be repositioned to the desired area on the base plate assembly 100 and the desired tooling components can be mounted to the base assembly 200.

Figure 10:
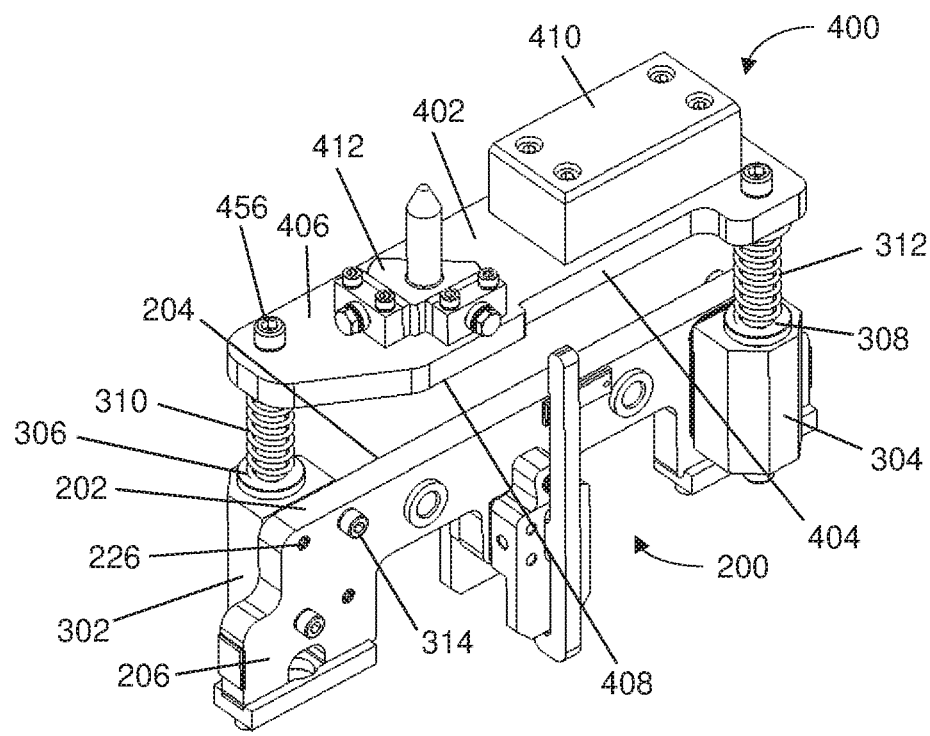
FIG. 10 is a top perspective view of an exemplary tool base assembly in accordance with embodiments of the present disclosure and a first type of tooling component detachably mounted to the tool base assembly.
Figure 11:
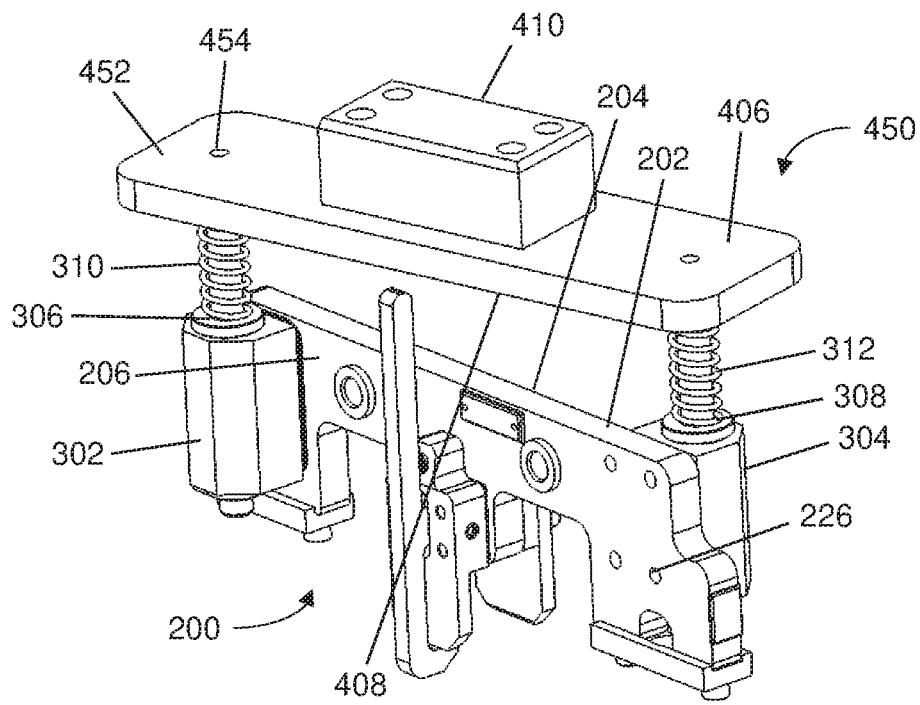
FIG. 11 is a top perspective view of an exemplary tool base assembly in accordance with embodiments of the present disclosure and a second type of tooling component detachably mounted to the tool base assembly.

FIGS. 10 and 11 are top perspective views of two different types of tooling components 400, 450 detachably and interchangeably mounted to the base assembly 200. The base assembly 200 can include fixation members 302, 304 detachably mountable to either one of the side surfaces 204, 206 of the support member 202. The fixation members 302, 304 include a body with a threaded opening 306, 308 extending at least partially therethrough. The threaded opening 306, 308 can be complementary to outer threads of a mounting rod 310, 312. The mounting rod 310, 312 can be selectively threaded into the respective opening 306, 308 to adjust the extension or height of the mounting rod 310, 312 relative to the fixation member 302, 304. The fixation members 302, 304 include holes formed in one side (e.g., a set of two holes, a set of four holes, or the like) corresponding with the transverse holes 226 of the support member 202 such that the fixation members 302, 304 can be mounted to the support member 202 with fasteners 314.

The tooling components 400, 450 can include a mounting platform 402, 452 attachable to the mounting rods 310, 312. In some embodiments, the mounting platform 452 can define a substantially rectangular configuration. In some embodiments, the mounting platform 402 can define an irregularly shaped configuration with one or more cutouts 404 depending on the additional components mounted to the mounting platform 402. The top and bottom surfaces 406, 408 of the mounting platform 402, 452 can be substantially planar or flat. The mounting platform 402, 452 can include mounting holes 454 on either side of the mounting platform 402, 452. Fasteners 456 can be passed through the mounting holes 454 and threaded into a hole at the top of the mounting rod 310, 312 for fixation of the mounting platform 402, 452 to the mounting rods 310, 312.

During assembly, the fixation members 302, 304 can be mounted on opposing side surfaces 204, 206 of the support member 202. For example, the fixation member 302 can be mounted to the side surface 204 and the fixation member 304 can be mounted to the side surface 206. In some embodiments, the fixation members 302, 304 can be mounted to the same side surface 204, 206. The mounting rods 310, 312 can be engaged with the fixation members 302, 304 and set to the desired height or extension relative to the fixation members 302, 304. The mounting platform 402, 452 can be attached to the mounting rods 310, 312, and the height of the mounting rods 310, 312 can be adjusted again, if needed.

Additional tools 410, 412 can be detachably coupled to the mounting platform 402, 452 as needed for the manufacturing process. In some embodiments, the mounting platforms 402, 452 can be fabricated with the tooling components 410, 412 such that if different tools 410, 412 are needed, the entire mounting platform 402, 452 can be interchanged relative to the base assembly 200 without having to disposed of or change the base assembly 200.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An adaptive tooling system, comprising:
an adaptive base plate assembly including a base plate with holes formed therein, and a plurality of location pins attached to the base plate via the holes; and
a tool base assembly including a central support member, first and second lock plates, and a latch pivotably disposed relative to the central support member, each of the first and second lock plates including an opening formed therein,
wherein the opening of the first lock plate and the opening of the second lock plate are configured to at least partially receive first and second location pins of the plurality of location pins, respectively; and
wherein the latch is configured to releasably engage with a third location pin of the location pins of the adaptive base plate assembly to releasably engage the tool base assembly with the adaptive base plate assembly.

2. The adaptive tooling system of claim 1, wherein the holes formed in the base plate are arranged as a matrix of holes spaced at a uniform distance from each other.

3. The adaptive tooling system of claim 1, wherein each of the location pins includes a top rounded section, a middle section, and an intermediate section.

4. The adaptive tooling system of claim 3, wherein a diameter of the middle section is dimensioned greater than a diameter of the intermediate section, a difference in the diameters forming a circumferential step between the middle section and the intermediate section.

5. The adaptive tooling system of claim 1, wherein each of the holes formed in the base plate includes a counterbored portion at a top surface of the base plate and a countersunk portion at a bottom surface of the base plate.

6. The adaptive tooling system of claim 1, wherein the tool base assembly is configured to interchangeably receive one or more tooling components.

7. The adaptive tooling system of claim 1, wherein the central support member includes first and second side projections on either side of the central support member, and a central projection disposed between the first and second side projections, two U-shaped cutouts separating the central projection from the first and second side projections.

8. The adaptive tooling system of claim 7, wherein the first and second side projections of the central support member each define bottom surfaces of the central support member, the first lock plate attached to the bottom surface of the central support member defined by the first side projection and the second lock plate attached to the bottom surface of the central support member defined by the second side projection.

9. The adaptive tooling system of claim 1, wherein the opening of the first lock plate includes one or more vertical inner slots formed along a circumference of the opening.

10. The adaptive tooling system of claim 1, comprising first and second pivot plates attached to a central protrusion of the central support member.

11. The adaptive tooling system of claim 10, wherein during engagement of the tool base assembly with the adaptive base plate assembly, the first and second pivot plates are configured to slide and be positioned against outer surfaces of the third location pin to prevent pivoting of the tool base assembly relative to the adaptive base plate assembly.

12. The adaptive tooling system of claim 10, wherein the latch is pivotably attached to the second pivot plate and includes a spring biasing the latch into a closed position.

13. The adaptive tooling system of claim 12, wherein during engagement of the latch with the third location pin, a projection of the latch engages with a circumferential step of the third location pin.

14. An adaptive base plate assembly, comprising:
a base plate including a matrix of holes formed therein, each hole of the matrix of holes includes a counterbored section to form an inner step; and
location pins attached to the base plate via holes of the matrix of holes,
wherein each of the location pins includes a top rounded section having a circular cross section, a middle section disposed adjacent to the top rounded section, an intermediate section disposed below the middle section, a bottom section disposed below the intermediate section, and a base section defining a bottom of the location pin;
wherein a diameter of the base section is dimensioned smaller than a diameter of the bottom section such that during assembly, the base section is disposed within the counterbored section of the hole of the base plate and the bottom section is disposed against a top surface of the base plate.

15. The adaptive base plate assembly of claim 14, wherein a diameter of the middle section is dimensioned greater than a diameter of the intermediate section and the diameter of the bottom section, a difference in the diameters formed circumferential steps in the location pins.

16. The adaptive base plate assembly of claim 14, wherein the diameter of the bottom section is dimensioned greater than a diameter of the intermediate section.

17. The adaptive base plate assembly of claim 14, wherein each of the location pins includes a hole axially formed therein to extend into the location pins from the base section, the hole configured to receive and engage with a fastener to secure the location pins to the base plate.

18. The adaptive base plate assembly of claim 14, wherein the top rounded section includes a plurality of circular diameters.

19. A tool base assembly, comprising:
a central support member;
first and second lock plates removably attached to bottom surfaces of the central support member, each of the first and second lock plates including an opening formed therein; and
a spring-loaded latch pivotably disposed relative to the central support member, a spring biasing the spring-loaded latch into a normally closed position.

20. The tool base assembly of claim 19, wherein the opening of the first lock plate includes one or more vertical inner slots formed along a circumference of the opening, and the opening of the second lock plate defines a uniform circumference without vertical inner slots.

21. The tool base assembly of claim 19, comprising first and second pivot plates attached to opposing sides of the central support member, the spring-loaded latch pivotably attached to the second pivot plate.

* * * * *